May 12, 1964  B. DAVIS  3,132,855
COMPENSATING SPRING DEVICES
Filed Jan. 2, 1962

INVENTOR
BRET DAVIS,
BY Stone & Mack
ATTORNEYS

United States Patent Office 3,132,855
Patented May 12, 1964

3,132,855
COMPENSATING SPRING DEVICES
Bret Davis, Ollie, Iowa
Filed Jan. 2, 1962, Ser. No. 163,823
1 Claim. (Cl. 267—60)

The present invention relates to spring devices, and is more particularly directed to a booster or compensating spring for use in conjunction with coil springs forming part of the suspension system of automobiles or vehicles.

It is known that the over-all height of a coil spring, such as used in automobiles, may decrease after the spring has been subjected to sustained loads, because the spring takes an additional permanent set. When used in an automobile, such shortening of height of one or more of the springs results in sagging of the automobile, improper alignment of its wheels, inability of the spring suspension system to properly support normal loads, and, in general, in the deterioration of the riding qualities of the automobile.

An object of the present invention is to provide a compensating spring adapted to be applied to a coil spring to restore it to its initial height.

Another object of the invention is to provide a booster spring adapted to be applied to a coil spring for the purpose of increasing its load carrying capacity.

A further object of the invention is to provide a booster or compensating spring adapted to be applied to the coils of a coil spring, the booster or compensating spring having a variable spring rate. The booster or compensating spring has a relatively high spring rate under low loads, but a lesser spring rate under high loads so that the coil spring and booster spring combination is not too stiff, thus avoiding impairing the riding qualities of the automobile in which this combination is employed.

Another object of the invention is to provide an auxiliary spring to be applied to the coils of a coil spring, such as an automobile coil spring, the auxiliary spring occupying a minimum amount of space, thereby avoiding interference with the automobile frame and other automobile parts adjacent to the coil spring.

Yet another object of the invention is to provide an auxiliary spring to be applied to the coils of a coil spring, such as the spring of an automobile suspension system in which the auxiliary spring creates a damping effect in the suspension system returning the latter to a condition of equilibrium in lesser time, thereby maintaining the wheels of an automobile in constant contact with the highway.

A further object of the invention is to provide an auxiliary spring to be applied to and supported by the turns or coils of a coil spring, in which the auxiliary spring retains itself in its position of installation on the coil spring, and does not shift or creep around the turns of the coil spring during contraction and elongation of the springs under varying load conditions.

Referring to the drawings.

Figure 1:
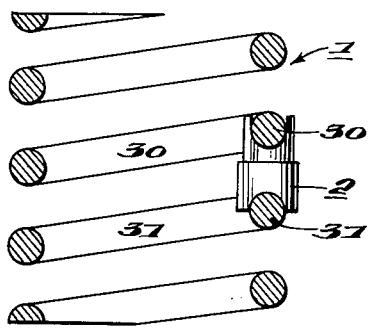
FIGURE 1 is an elevational view of a coil spring with the booster or compensating spring insert.

The invention is disclosed in the drawing, by way of example, as being applied to the suspension system of an automobile and more particularly to the helical compression spring.

As shown, it is apparent that with a coil spring 1 such as that utilized in the front supporting end of an automobile, the coil spring, when installed, is preformed to retain a certain load and provide good riding qualities of the automobile. The coil spring 1 will, under continued use, due to the fatigue of the metal, lose some of its original set, the tendency being for the length of the coil spring to be reduced under continuous load and, as this coil is reduced in its original set, there is less of the riding quality provided originally. To temporarily restore spring 1 to its original form, any of the coils may be separated and one or a pair of booster inserts 2 may be inserted, as illustrated in FIGURE 1, the number of inserts being used depending upon the amount of deformation existing in the spring at the time of installing the booster insert.

Figure 3:
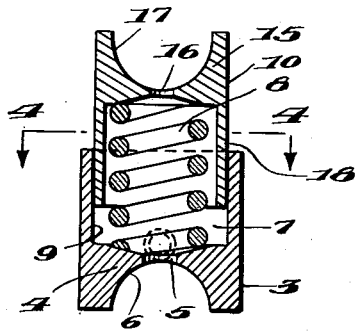
FIGURE 3 is a cross-sectional view taken on line 3—3 of FIGURE 2.
Figure 2:
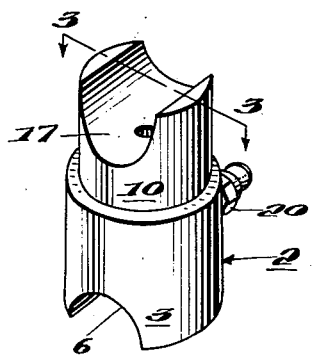
FIGURE 2 is a perspective view of the booster or compensating spring.
Figure 5:
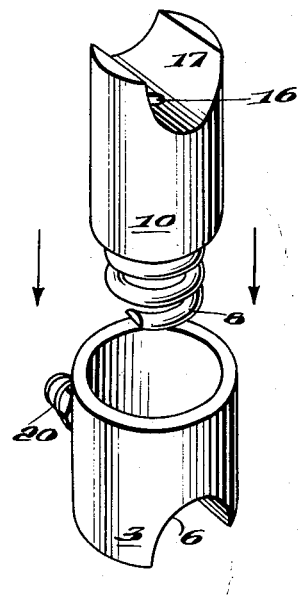
FIGURE 5 is an exploded view of the booster or compensating spring shown in FIGURE 2.
Figure 4:
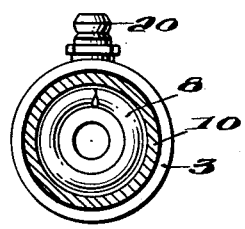
FIGURE 4 is a cross-sectional view taken on line 4—4 of FIGURE 3.

This invention contemplates a particular design of booster insert and is primarily concerned with the form shown in FIGURES 2 and 3, in which a metal hollow cylindrical member 3 or a main encasing member is open at one end and closed at the other end 4 except for a hole 5 in the center thereof. The outer surface of the end 4 is cut with a U-shaped or curved center or saddle 6 to fit the peripheral curvature of the coils of the spring 1. The hollow portion 7 of the member 3 accommodates a heavy duty high tension coil spring 8. Said spring rests upon the end 4 and is positioned so that its convolutions are spaced from the inner surface 9 of the cylindrical member 3. Fitting over the spring 8 is another metal hollow cylindrical member 10, completely open at its lower end and closed at the other end 15 except for a hole 16 in the center thereof. The outer surface of the end 15 is cut with a U-shaped or curved center or saddle 17 to fit the peripheral curvature of the coils of the spring 1. This latter member 10 may be likened to a piston which has a sliding fit in the member 3, the downwardly depending wall portion 18 fitting in between the spring 8 and the inner surface 9 of the member 3. The members 3 and 10 are in a telescoped position with the spring 8 held confined between said members.

There is provided a lubricant fitting 20 of the familiar pressure-gun type, which fitting communicates with the lower inner portion of the member 3 for the purpose of supplying lubricant to the telescoped members. The holes 5 and 16 permit lubricant to escape and lubricate the U-shaped or curved centers 6 and 17. When the booster element 2 is mounted in the position as illustrates in FIGURE 1, it is apparent that the peripheral curvature of the coil will seat within the curved centers 6 and 17 and provide a good tight gripping relationship between the booster element and the coils of the spring 1.

During use of the automobile or vehicle the spring 1 is subjected to a variety of loads, ranging from a static load while the vehicle is at rest or under a constant load, to intermittent increases and decreases in load resulting from the movement of the vehicle over a road surface, particularly when such road surface is not uniform. In the use of the vehicle under varying conditions, the helical suspension spring, instead of retaining a desired over-all height under the usual static load applied to it, sags to some extent so that such desirable over-all height is decreased. Since all of the springs in the suspension system do not decrease in height to the same extent, the result is a tilting of the frame or chassis of the vehicle which produces excessive wear on the wheel supporting and steering mechanism, producing incorrect caster, camber, toe-in and toe-out of the front wheels of the vehicle. It also results in the reduction in the maximum load that each spring can carry before being collapsed to a solid height, resulting in "bottoming" of the vehicle during its movement over the road surface, which is uncomfortable to the occupants of the vehicle.

In the present invention, the booster spring is applied to the coils of the coil spring 1 to restore the latter to its initial static height. The lower and upper saddles 6 and 17 are spaced a substantial distance from one another when the spring 8 is under no load. Such spacing is greater than the distance between adjacent coils 30, 31 of the spring 1 when the latter is under a static load, requiring that the saddle portions be forced toward each other for insertion of the booster 2 in position on the helical spring 1, with a coil 30 being received within the saddle 17 and the coil 31 being received within the saddle 6. The booster spring or a plurality of booster springs, that may have been mounted on the spring 1, will exert an elevating force on the coils in the spring 1, separating adjacent turns of the coil spring 1 and resulting in an elevation of the spring to the desired over-all height.

As the load on the helical spring 1 increases, it is compressed or shortened in height, the adjacent turns 30 and 31 being shifted toward one another and causing the saddle portions 17 and 6 to be moved toward one another to the extent limited by the movement of the cylindrical member 10 towards the end 4.

The spring 8 is relatively stiff under light load conditions, or has a comparatively high spring rate, and when inserted between the coils 30 and 31 and subjected only to the static load applied to the spring 1 it will restore the spring 1 to the required initial statically loaded height. As the load on the spring 1 increases, a portion of such increased load is also imposed upon the auxiliary or booster spring 8, but the force required to deflect such spring 8 a given amount in moving the saddle portions 17 and 6 toward each other increases.

The inventor claims:

In a suspension mechanism of the class described, the combination of a pair of interfitting cylindrical encasing members telescopically engaging each other and associated with and movable toward and from each other, a coil spring confined within and between said encasing members, each of said encasing members being open at one end and substantially closed at its opposite end, each closed end being provided on its outer surface with a curved bearing portion, one of said closed ends being provided with a downwardly extending hollow cylindrical wall portion slidable within an upwardly extending hollow cylindrical wall portion extending from the closed end of said other encasing member, said downwardly extending hollow cylindrical wall portion fitting in between said coil spring and the inner surface of said upwardly extending hollow cylindrical wall portion, said closed ends being provided with lubricant openings and said upwardly extending cylindrical wall portion being provided with a lubricant supplying means whereby the coil spring and said bearing portions may be lubricated.

References Cited in the file of this patent
UNITED STATES PATENTS

| | | |
|---|---|---|
| 2,206,315 | Zimmerman | July 2, 1940 |
| 2,807,459 | Copeland | Sept. 24, 1957 |
| 2,850,274 | Villar | Sept. 2, 1958 |
| 2,904,329 | Joseph | Sept. 15, 1959 |